US000001303H

United States Statutory Invention Registration [19]

[11] Reg. Number: H1303

[43] Published: Apr. 5, 1994

Miller et al.

[54] REMOVAL OF NICKEL CATALYST FROM POLYMER SOLUTIONS BY WATER ADDITION AND CENTRIFUGATION

[75] Inventors: James H. Miller, Katy; Zaida Diaz; Carma J. Gibler, both of Houston, all of Tex.

[73] Assignee: Shell Oil Company, Houston, Tex.

[21] Appl. No.: 527,970

[22] Filed: May 24, 1990

[51] Int. Cl.[5] ..... C08F 6/08

[52] U.S. Cl. ..... 528/495; 528/502; 528/499

[58] Field of Search ..... 528/499

[56] References Cited

U.S. PATENT DOCUMENTS

| | | | |
|---|---|---|---|
| 2,893,982 | 7/1959 | Campbell | 260/85.1 |
| 3,023,201 | 2/1962 | Moberly et al. | 260/94.7 |
| 3,531,448 | 9/1970 | Johnson | 260/85.1 |
| 3,780,137 | 12/1973 | Hassell | 260/880 B |
| 3,780,138 | 12/1973 | Hassell et al. | 260/880 B |
| 3,793,306 | 2/1974 | Farrar et al. | 260/85.1 |
| 3,793,307 | 2/1974 | DeVault | 260/85.1 |
| 4,016,349 | 4/1977 | McKenna | 528/482 |
| 4,028,485 | 6/1977 | Poloso et al. | 528/486 |
| 4,098,991 | 7/1978 | Kang | 528/492 |
| 4,396,761 | 8/1983 | Willis et al. | 528/487 |
| 4,421,874 | 12/1983 | Seefluth | 523/315 |
| 4,567,251 | 1/1986 | Balas | 528/487 |
| 4,581,431 | 4/1986 | Yamazaki et al. | 528/494 |
| 4,595,749 | 6/1986 | Hoxmeier | 528/483 |

FOREIGN PATENT DOCUMENTS

| | | | |
|---|---|---|---|
| 0186918 | 10/1985 | European Pat. Off. | C08F 6/08 |
| 264885 | 4/1988 | European Pat. Off. . | |
| 840477 | 10/1972 | U.S.S.R. . | |
| 1020720 | 2/1966 | United Kingdom . | |
| 1444736 | 8/1976 | United Kingdom | C08F 6/08 |

*Primary Examiner*—Robert L. Stoll
*Assistant Examiner*—Joseph D. Anthony
*Attorney, Agent, or Firm*—Donald F. Haas

[57] ABSTRACT

A process is provided comprising the steps of contacting a Group VIII metal hydrogenation catalyst residue containing polymer solution with from about 2 to about 50 parts by weight water based on 100 parts by weight of polymer solution, centrifuging the polymer from metal containing particles with a centrifugal force such that the centrifugal force times the time duration of centrifugation divided by the viscosity of the polymer solution equals or exceeds about 50 G-minutes/cp, and recovering a polymer solution comprising less than 10 ppm by weight, based on the polymer, of the Group VIII metal.

13 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

REMOVAL OF NICKEL CATALYST FROM POLYMER SOLUTIONS BY WATER ADDITION AND CENTRIFUGATION

FIELD OF THE INVENTION

This invention relates to a process to prepare hydrogenated polymers. More particularly, the invention relates to the removal of residues of hydrogenation catalysts from solutions comprising hydrogenated polymers.

BACKGROUND OF THE INVENTION

The uses of polymeric materials, including diolefin polymers, continue to grow rapidly in such diverse areas as protective paint coverings, wire insulation, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultraviolet degradation. Polymer hydrogenation processes have therefore been studied for many years as a method to prepare novel materials with excellent stability and other desirable properties. Early processes utilized heterogeneous catalysts which were known to be useful for hydrogenation of low molecular weight olefins and aromatics. Nickel on kieselguhr is an example of this type of catalyst. A fine catalyst powder was preferred and large amounts of catalyst were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Nickel octoate/triethyl aluminum hydrogenation catalyst systems were then developed which enabled rapid hydrogenation of polymers. The catalyst is utilized as a colloidal suspension in polymer containing solutions. This type of catalyst is referred to as a homogeneous catalyst. Such a process has been used for a number of years to prepare hydrogenated butadiene-styrene polymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation with homogeneous catalysts and the hydrogenation process is rapid and complete in minutes. However, removal of the catalyst from the polymer product is necessary because metals, and particularly nickel, which remain with the polymer catalyze degradation of the polymer product. The catalyst is typically removed from the polymer solution by the addition of an ammonium phosphate-water solution and air to oxidize the nickel to a divalent state. The mixed nickel-aluminum phosphate can then be removed from the hydrogenated polymer solution by filtration.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment of the polymer solution with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because those processes require relatively expensive metallurgy due to the corrosive nature of the compounds. Many also require the consumption of a continuous stream of reactants, and produce an acid sludge containing the catalyst and residues of the treatment chemicals.

U.S. Pat. Nos. 3,531,448; 3,793,306; and 3,793,307 disclose, as comparative examples, processes for removing nickel hydrogenation catalyst residues from polymer solutions by water extraction. In each of these comparative examples fine particles of solids were formed which rapidly plugged a filter when filtration of the solids from the solution was attempted.

It is therefore an object of this invention to provide a process to remove hydrogenation catalyst residue from polymer solutions. It is a further object of this invention to provide a process to remove hydrogenation catalyst residue from polymer solutions which does not require the treatment of the polymer solution with amine, phosphate or sulfate compounds. In another aspect, it is an object of this invention to provide a process which is capable of removing hydrogenation Group VIII metal catalyst residue from polymer solutions to a level of 10 ppm or less based on the polymer.

SUMMARY OF THE INVENTION

The objects of this invention are accomplished by providing a process comprising the steps of contacting a Group VIII metal hydrogenation catalyst residue containing polymer solution with from two to 50 parts by weight of water based on 100 parts by weight of polymer solution and catalyst solids, centrifuging to separate a polymer solution phase from an aqueous phase and a solid phase containing the metal with a centrifugal force such that the centrifugal force times the minutes of centrifugation divided by the viscosity of the polymer solution is equal to or greater than about 50 G-minutes/cp, and recovering a polymer solution containing less than 10 ppm by weight, based on the polymer, of Group VIII metals. It has been surprisingly found that simple water addition can be used to promote the separation of these catalyst residues from the polymer solutions without the need for contaminating the polymer solution with additional compounds and without requiring the use of corrosive reactants. The present invention therefore does not contaminate the polymer or require an additional purification step in the polymer production process. The hydrogenation catalyst residue containing solution may optionally be exposed to oxidants before and/or during the catalyst removal process.

DETAILED DESCRIPTION OF THE INVENTION

The polymer solutions of the present invention preferably comprise from one to about 40 percent by weight of a polymer, and more preferably comprise from about two to about ten percent by weight of polymer based on the total amount of solution. The polymer is a partially, selectively, or totally hydrogenated polymer. The present invention does not depend upon the type or nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial or star.

In a most preferred embodiment, the polymer is an anionically polymerized conjugated diolefin polymer which was anionically polymerized in an inert solvent, and then hydrogenated in the same solvent to form the hydrogenation catalyst residue containing polymer solution.

When an anionic initiator is used, polymers will typically be prepared by contacting the monomers with an organoalkali metal compound in a suitable solvent at a temperature within the range from about −100° C. to about 300°, preferably at a temperature within the range from about 0° C. to about 100° C. Particularly effective polymerization initiators are organolithium compounds having the general formula:

$$RLi_n$$

Wherein: R is an aliphatic, cycloaliphatic or aromatic hydrocarbon radical having from one to about 20 carbon atoms; and n is an integer from 1 to 4.

When the polymer is a block copolymer, the copolymer is preferably a styrene-conjugated diolefin block copolymer. This is due to the thermoplastic and elastomeric nature of these polymers. The polystyrene blocks, being incompatible with the polyconjugated olefin blocks, form separate domains, and these domains have relatively high glass transition temperatures. Above the glass transition temperatures of the polystyrene domains the polymer is in a melt and can be molded, extruded or blended with other components. Below the glass transition temperature of the polystyrene, the hard polystyrene domains act as physical crosslinks between the rubbery polyconjugated diolefin chains. This results in excellent elastomeric properties along with reprocessibility.

The polymer of the present invention is contacted with hydrogenation catalyst and hydrogen in an inert solution with a solvent such as cyclohexane, normal hexane, heptane, pentane, octane or diethyl ether. When the hydrogenation conditions are such that aromatic unsaturation is not hydrogenated, aromatic solvents such as toluene, xylenes or benzene may be used. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

The catalyst metals which are preferred include iron, cobalt, nickel and palladium. Nickel and cobalt are most preferred. Iron is not most preferred because it is less active than the others, and palladium is not particularly preferred because it is more expensive than nickel and cobalt.

Hydrides or alkyls of lithium, magnesium or aluminum are preferred as the cocatalysts due to the excellent hydrogenation activity of these systems.

The hydrogenation catalysts are insoluble in the polymer solutions, and form a colloidal suspension although they are typically referred to as "homogenous" catalyst systems to differentiate them from hydrogenation catalysts which are suspended porous solids.

The hydrogenation catalyst residue containing polymer solution is contacted with the water either in a continuous process or in a batch process. Static mixers may be utilized to contact the hydrogenation catalyst residue containing polymer solution with the water in a continuous process. The polymer solution may be contacted with the water in stages, and preferably countercurrent stages. Batch contacting may be accomplished in a vessel equipped with a mixer. Mixing is required only to the extent necessary for thorough contacting of the water and polymer solution.

The amount of water that must be present to result in a good separation of the catalyst particles from the solution is about 2 to about 50 parts by weight based on 100 parts by weight of polymer solution. The water may be in a liquid or a vapor state, and the separation can be effectively performed at a wide range of temperatures and pressures. Temperatures of between 20° C. and 210° C. can be utilized, but temperatures between 90° C. and about 150° C. are preferred. The pressure may be either above, below or at the dew point of the composition during the period the polymer solution is being contacted with the water.

The water is preferably free of strong acids and bases in order to permit the use of less expensive process equipment. The water is also preferably free of other solutes to prevent contamination of the polymer. The water therefore preferably has a pH of between about 5 and about 9 and contains less than about 0.3 percent by weight of solutes.

The treated polymer solution is recovered from the slurry-polymer solution mixture by centrifugation. Any apparatus capable of imparting 100 or more G forces onto the solution may be used to centrifuge the solid particles from the solution. The separation can be performed with less centrifugal force, but the polymer solution must be diluted excessively or the residence time in the centrifuge must be excessive in order for an acceptable separation if a centrifuge is utilized which imparts less force.

The centrifugal force required to effect a separation of the hydrogenation catalyst containing solids from the polymer solution is greatly affected by the viscosity of the polymer solution. According to Stoke's law, the settling velocity of a solid particle in a liquid medium is inversely proportional to the viscosity of the liquid. Although polymer solutions are notoriously non-Newtonian and Stoke's law is not necessarily applicable, this inverse relationship can be used to determine when an acceptable centrifugal separation can be achieved. It has been found that the centrifugal force times the time of the centrifugation divided by the viscosity of the polymer solution must equal or exceed about 50 G-minutes/cp for an acceptable separation to be achieved.

More preferably, about 100 G-minutes/cp of centrifugal force is provided to result in a good separation.

The viscosity of the polymer solution can be reduced by raising the temperature of the solution, or by diluting the polymer solution with additional solvent if needed to achieve an acceptable solution viscosity considering the equipment and residence time limitations applicable. Dilution of the polymer solution is particularly effective because dilution by a factor of two can reduce a polymer solution viscosity by an order of magnitude.

An oxidizer, such as molecular oxygen or a peroxide, may optionally be present when the polymer solution is contacted with the water or may be contacted with the polymer solution before the polymer solution is contacted with water. Oxidizing agents increase the valence of the hydrogenation catalyst metals, which, under some circumstances, enhances the agglomeration and precipitation of the metal particles.

EXAMPLES

Five block copolymers were polymerized in cyclohexane or a cyclohexane/diethyl ether mixture using sec-butyllithium as an anionic polymerization initiator to prepare polymer solutions for these examples. After sequential polymerization of styrene and either isoprene or butadiene, the living polymers were terminated by addition of a small amount of methanol. The structures, number average molecular weights, and percent by weight polymer in the solutions for each of the five types of polymers prepared are listed in Table 1.

TABLE 1

| Polymer Solution | Structure | Molecular Weight | Styrene % wt. | Polymer % wt. | Solution Ni ppm wt. |
|---|---|---|---|---|---|
| A | S—B—S | 50,000 | 30 | 17. | 226 |
| B | S—B—S | 50,000 | 30 | 11.3 | 133 |
| C | S—B—S | 182,000 | 33 | 3. | 15 |
| D | S—B—S | 68,000 | 30 | 16.5 | 80 |
| E | S—I | 100,000 | 37 | 5. | 50 |

The solutions were hydrogenated by addition of a nickel (2-ethylhexanoate)/triethylaluminum hydrogenation catalyst and hydrogen. The nickel contents of the hydrogenated polymer solutions as determined by atomic absorption are also included in Table 1. The solutions were then held at about 80° C. under about 700 PSIG hydrogen partial pressure for about three hours to accomplish hydrogenation of the polymers. The ethylenic unsaturation was more than 98% hydrogenated and the aromatic unsaturation was less than 2% hydrogenated in each of the hydrogenated polymers. The hydrogenated polymer solutions were black.

Eleven examples of the invention were prepared as described below in Table 2. For each of the examples, a sample of one of the five solutions was placed in an autoclave with water and either an air or a nitrogen cap. Example 5 was prepared using a nitrogen cap, the others were prepared using air caps. The contents of the autoclave were then heated to the target temperature and held for about ten to about 60 minutes. The autoclave was then cooled and a polymer solution phase was decanted off. The nickel and aluminum contents of the decanted polymer solution phases were then measured by atomic absorption. The polymer solutions were then centrifuged with about 34,000 G's force for about a half hour. The nickel and aluminum contents of the centrifuged phases were then measured by atomic absorption. The water to polymer solution weight ratio, the temperature and pressure of the autoclave and nickel and aluminum contents measured are below in Table 2. Where numbers are not provided in Table 2, the information was not determined.

TABLE 2

| Example | Soln.[1)] | H2O:Soln. wt. ratio | Temp F. | Pressure psia | Decanted Ni | Soln.[1)] Al | Centrifuged Ni | Soln. Al |
|---|---|---|---|---|---|---|---|---|
| 1 | A | 0.1 | 400 | 295 | — | — | 0.7 | 2. |
| 2 | A | 0.1 | 300 | 155 | — | — | 0.2 | 2. |
| 3 | B | 0.02 | 400 | 255 | 15. | 15. | 3. | 2. |
| 4 | B | 0.02 | 300 | 115 | 5. | 3. | 0.3 | 0.3 |
| 5 | B | 0.02 | 300 | — | 11. | 11. | 0.5 | 0. |
| 6 | B | 0.02 | 300 | 115 | 13. | 14. | 0.7 | 1.0 |
| 7 | C | 0 02 | 300 | 115 | 2. | 3. | 0. | 0.5 |
| 8 | C | 0.02 | 210 | 55 | 2. | 3. | 0. | 0.9 |
| 9 | D | 0.02 | 300 | 115 | 58. | — | 0. | — |
| 10 | E | 0.02 | 300 | 115 | 2. | 4. | 0.2 | 1.0 |
| 11 | E | 0.02 | 200 | 55 | 13. | 12. | 0. | 0.6 |

[1)]Ni and Al concentrations in ppm based on the polymer solution.

With the exception of Example 3, each of the examples resulted in a polymer solution containing an acceptably low level of nickel.

To determine the minimum amount of centrifugation which is required to effect the separation of the solids from the polymer solutions, a sample of polymer solution which had been contacted with 0.02 parts of water was diluted by one part cyclohexane to one part of slurry, and the solids were removed by centrifugation at varying conditions. This dilution reduced the room temperature viscosity of the solution from about 150 cp to about 20 cp. An excellent separation was achieved with 1000 G-minutes of centrifugation at room temperature. This corresponds to about 50 G-minutes/cp. It was further found that about 38 G-minutes/cp did not consistently result in an acceptable separation.

We claim:

1. A process to remove a Group VIII metal hydrogenation catalyst residue from a hydrogenated conjugated diolefin polymer solution comprising the steps of:

a) contacting the polymer solution with from about 2 to about 50 parts by weight of water based on 100 parts by weight of the polymer, said water ha ving a PH of between about 5 and about 9 and containing less than about t 0.3% by weight of solutes based on 100 parts by weight of water;

b) separating the polymer solution from he catalyst residue by centrifugation with a centrifugal force such that the centrifugal force times the time of centrifugation divided by the viscosity of the polymer solution at centrifugation temperature equals or exceeds about 50 G-minutes/cp; and c) recovering a polymer solution comprising less than 10 ppm by weight, based on the polymer, of the Group VIII metals.

2. The process of claim 1 wherein the hydrogenation catalyst was prepared by combining a Group VIII metal carboxylate or alkoxide with an alkyl or hydride of a metal selected from Groups I-A, II-A and III-B of Medeleev's Periodic Table of Elements.

3. The process of claim 1 wherein the hydrogenation catalyst is prepared by combining a component selected from the group comprising nickel carboxylate, nickel alkoxide, cobalt carboxylate, iron alkoxide, palladium carboxylate and palladium alkoxide with a component selected from the group consisting of lithium alkyl, lithium hydride, magnesium alkyl, magnesium hydride, aluminum alkyl and aluminum hydride.

4. The process of claim 1 wherein the hydrogenation catalyst is prepared by combining nickel (2-ethylhexanoate) and an aluminum alkyl.

5. The process of claim 4 wherein the aluminum alkyl is triethylaluminum.

6. The process of claim 1 wherein the hydrogenation catalyst residue is in the form of a colloidal suspension.

7. The process of claim 1 wherein the polymer solution comprises from about 1 to about 40 percent by weight polymer based on the total polymer solution, in an inert solvent.

8. The process of claim 1 wherein the centrifugal force times the time duration of the centrifugation divided by the viscosity of the polymer solution at centrifugation temperature is equal to or greater than about 100 G-minutes/cp.

9. The process of claim 1 wherein the polymer is a copolymer comprising a monomer comprising conjugated diolefin units and styrene.

10. The process of claim 9 wherein the copolymer is a block copolymer comprising at least one block which comprises monomer units of conjugated diolefins and at least one block which comprises styrene monomer units.

11. The process of claim 7 wherein the polymer is anionically polymerized in the inert solvent prior to hydrogenation of the polymer.

12. The process of claim 1 wherein the temperature of the centrifugation is between 20° and 210° C.

13. The process of claim 1 wherein the temperature of the centrifugation is between 90° and 150° C.

* * * * *